United States Patent [19]

Kalm

[11] Patent Number: 5,765,676
[45] Date of Patent: Jun. 16, 1998

[54] PACKAGE AND BUNDLE SINGULATOR

[75] Inventor: W. Scott Kalm, Plano, Tex.

[73] Assignee: Electrocom Automation L.P., Arlington, Tex.

[21] Appl. No.: 806,555

[22] Filed: Feb. 25, 1997

Related U.S. Application Data

[60] Provisional application No. 60/021,488 Jul. 10, 1996.
[51] Int. Cl.⁶ .................................................. B65G 47/12
[52] U.S. Cl. .............................................. 198/443; 198/396
[58] Field of Search ................................. 198/392, 396, 198/397, 399, 443, 446

[56] References Cited

U.S. PATENT DOCUMENTS

| | | | |
|---|---|---|---|
| 4,583,635 | 4/1986 | Timmer et al. | 198/443 X |
| 4,984,678 | 1/1991 | Fauchard | 198/443 |
| 5,353,914 | 10/1994 | Stephen et al. | 198/443 |
| 5,427,224 | 6/1995 | Suehara et al. | 198/443 X |

*Primary Examiner*—James R. Bidwell
*Attorney, Agent, or Firm*—Gardere & Wynne, L.L.P.

[57] ABSTRACT

A package and bundle singulator having a cone shaped housing with an input receiving opening and an outlet discharge opening. A helix or spiral is formed on an inner surface of the housing to engage and separate packages and bundles entering the input receiving opening. A support frame rotatably supports and maintains the housing in an orientation where the input receiving opening is at a higher level than the output discharge opening. The housing is rotated by a drive assembly engaging the housing.

17 Claims, 6 Drawing Sheets

PACKAGE AND BUNDLE SINGULATOR

This application claims the benefit of U.S. Provisional application No. 60/021,488 filed on Jul. 10, 1996.

TECHNICAL FIELD

This invention relates to a package and bundle singulator and, more particularly, to singulating a plurality of packages and bundles traveling along a conveyor system.

BACKGROUND OF THE INVENTION

The United States Postal System presently delivers small packages and bundles of mail in bulk containers to a facility where they are placed unto a conveyor system for processing to a specific address location. Prior to processing, an operator is required to manually separate all of the packages and bundles located on the conveyor system. The manual separation of packages and bundles is inefficient, costly and requires considerable human labor.

Similar procedures to the one described in the preceding paragraph are also performed by other commercial enterprises engaged in the handling and delivery of small packages. Many of these commercial enterprises represent to their customers overnight delivery to a specified address location such that efficient handling of packages and bundles throughout the entire process is a top priority. Therefore, commercial enterprises also require that the packages and bundles be separated and singulated for efficient processing to the desired address location.

Accordingly, there is a need for a package and bundle singulator to minimize the use of manual labor to separate packages and bundles and to improve the efficiency of processing packages and bundles to a desired address location. Also there is a need to improve the speed at which the packages and bundles are singulated. These and other needs are addressed by the package and bundle singulator of the present invention.

SUMMARY OF THE INVENTION

The present invention is a package and bundle singulator having a cone shaped housing with an input receiving opening and an outlet discharge opening. A helix or spiral is formed on an inner surface of the housing to engage and separate packages and bundles introduced into the input receiving opening. A support frame engages and maintains the housing in an orientation where the input receiving opening is at a higher level than the output discharge opening. The housing is rotated by a drive assembly coupled to the housing.

In accordance with the present invention there is provided a package and bundle singulator that reduces the time and manual labor associated with singulating packages and bundles.

Further in accordance with the present invention there is provided a conveyor section incorporating a package and bundle singulator.

BRIEF DESCRIPTION OF THE DRAWINGS

A more complete understanding of the present invention and the advantages thereof may be had by reference to the following Detailed Description when taken in conjunction with the accompanying Drawings wherein.

DETAILED DESCRIPTION

Figure 1:
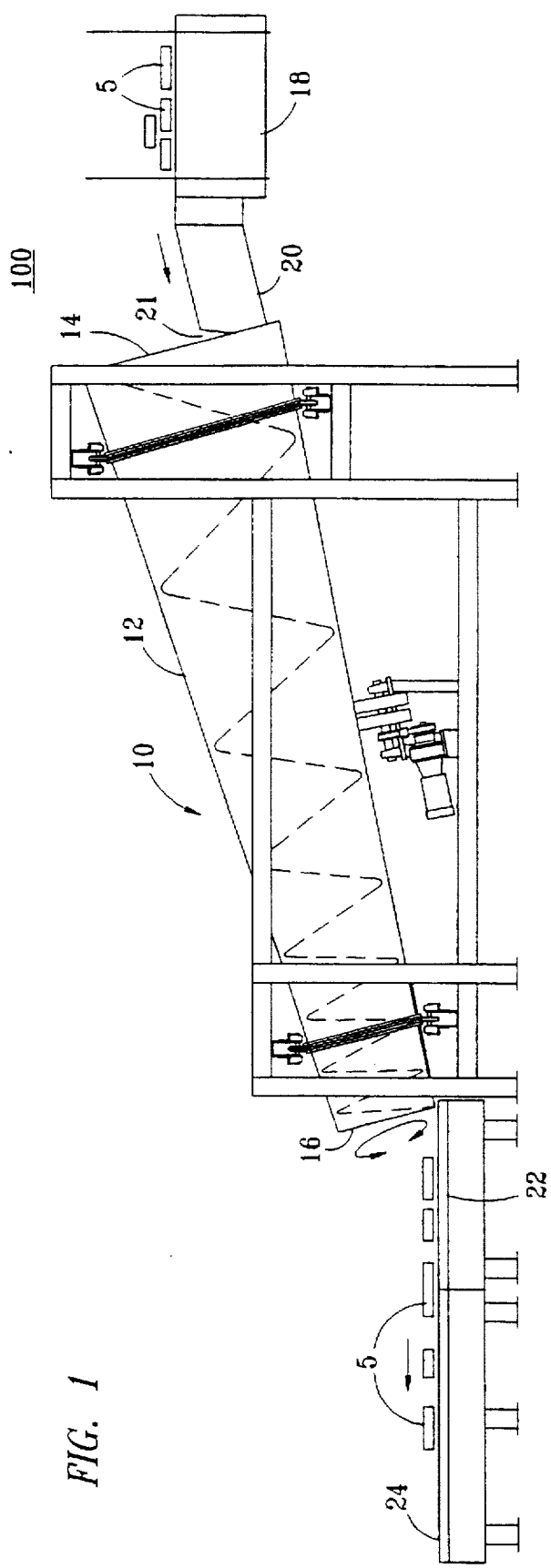
FIG. 1 is a first embodiment of a package and bundle singulator in combination with a conveyor section.

Referring to the Drawings, wherein like numerals represent like parts throughout the several views, there is disclosed a package and bundle singulator 10 in accordance with the present invention.

Although two embodiments of the singulator 10 incorporated with a conveyor section 100 will be discussed, those skilled in the art will appreciate that such embodiments are only two of many utilizing the principles of the present invention. Accordingly, the singulator 10 described should not be construed in a limiting manner.

Referring to FIG. 1, there is illustrated the conveyor section 100 in combination with a first embodiment of the singulator 10. A second embodiment of the singulator 10, illustrated in FIGS. 7 through 9, may likewise be incorporated into a combination with the conveyor section 100 illustrated in FIG. 1. The conveyor section 100 includes a feed conveyor 18 transporting packages and bundles 5 randomly placed in various degrees of separation. Any random singulation of the packages and bundles 5 on the feed conveyor 18 does not take place by design but rather by conventional operation of the feed conveyor.

The feed conveyor 18 terminates at a discharge slide 20 having an output 21 juxtaposed to an input receiving opening 14 of the singulator 10. The singulator 10 includes a housing 12 having at opposing ends an output discharge opening 16 and the input receiving opening 14. The input receiving opening 14 typically has a larger diameter than the outlet discharge opening 16. The housing 12 is preferably configured as a cone, however, other configurations including cylindrical shapes are also functional.

A metering belt 22 is juxtaposed to the outlet discharge opening 16 of the housing 12 and receives singulated packages and bundles 5 from the singulator 10. The metering belt 22 is a conventional type conveyor that transports the singulated packages and bundles 5 to a take-away belt 24. The take-away belt 24 transports the singulated packages and bundles 5 to a feed belt (not shown) for delivery of the packages and bundles to an operator for further processing before delivery to a desired address location.

Figure 2:
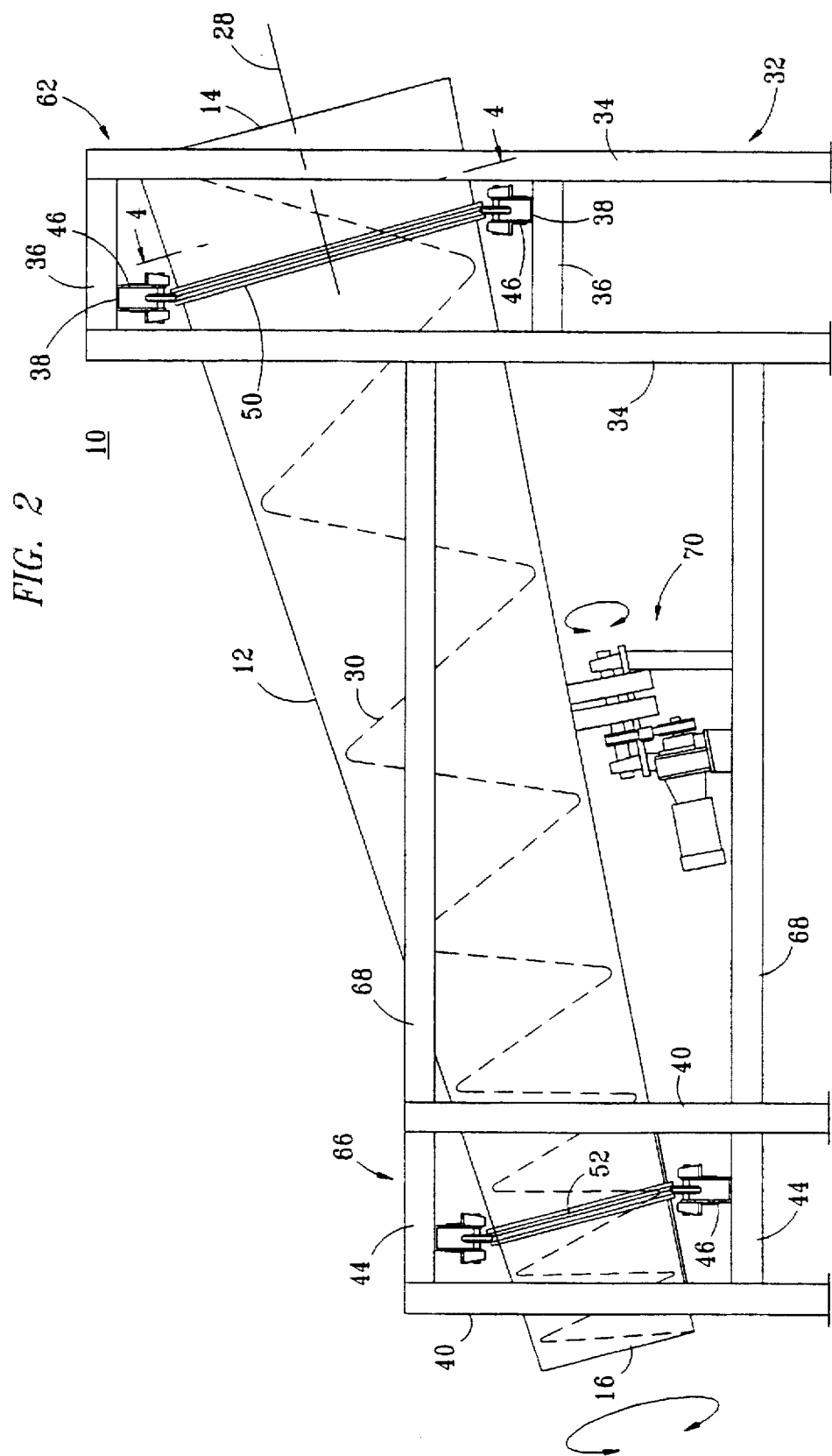
FIG. 2 is a side view of the singulator illustrated in FIG. 1.

Referring to FIG. 2, there is shown a side view of the first embodiment of the singulator 10. The housing 12 is located on a support frame 32 such that the longitudinal axis 28 of the housing is angularly displaced with reference to the horizontal. Typically, the angular displacement is 150, although other angular displacements may be preferable depending on the specific configuration of the housing 12 and a helix 30.

Figure 3:
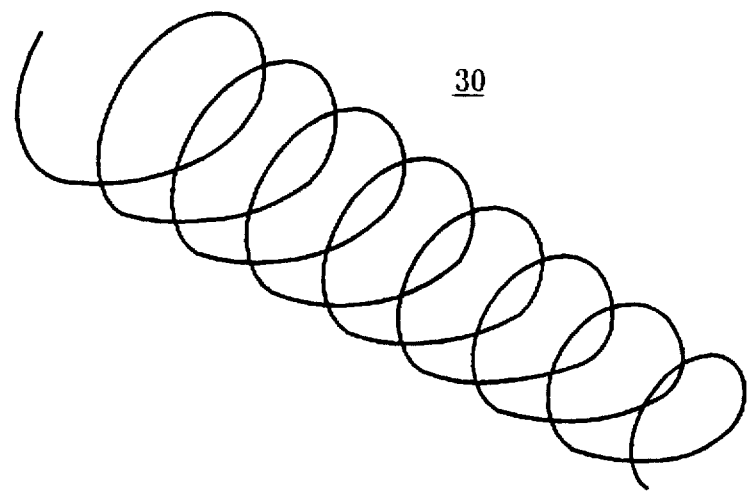
FIG. 3 is a perspective view of a helix formed on an inner surface of the housing of the singulator of FIG. 2.

Referring to FIG. 3, there is illustrated a helix or spiral 30 to be attached to or formed on an inner surface of the housing 12. The helix 30 includes a pitch that continually increases from the input receiving opening 14 to the outlet discharge opening 16. The pitch is the distance from any point on the helix 30 to a location on a corresponding point measured parallel to the longitudinal axis 28. Preferably, the shortest distance is greater than the longest dimension of a package or bundle 5 such that the package or bundle will travel between extensions of the helix 30.

Referring again to FIG. 2, the support frame 32 includes an upper support tower 62 and a lower support tower 66. The upper support tower 62 is an assembly of a plurality of vertical channels 34 and horizontal channels 36 for supporting the end of the housing 12 having the input receiving opening 14. The lower support tower 66 is also an assembly of a plurality of vertical channels 40 and horizontal channels 42 for supporting the end of the housing 12 having the outlet discharge opening 16.

Interconnecting the upper and lower support towers 62 and 66 are a plurality of cross channels 68. The cross channels 68 support a drive assembly 70 which imparts rotational motion to the housing 12.

Figure 4:
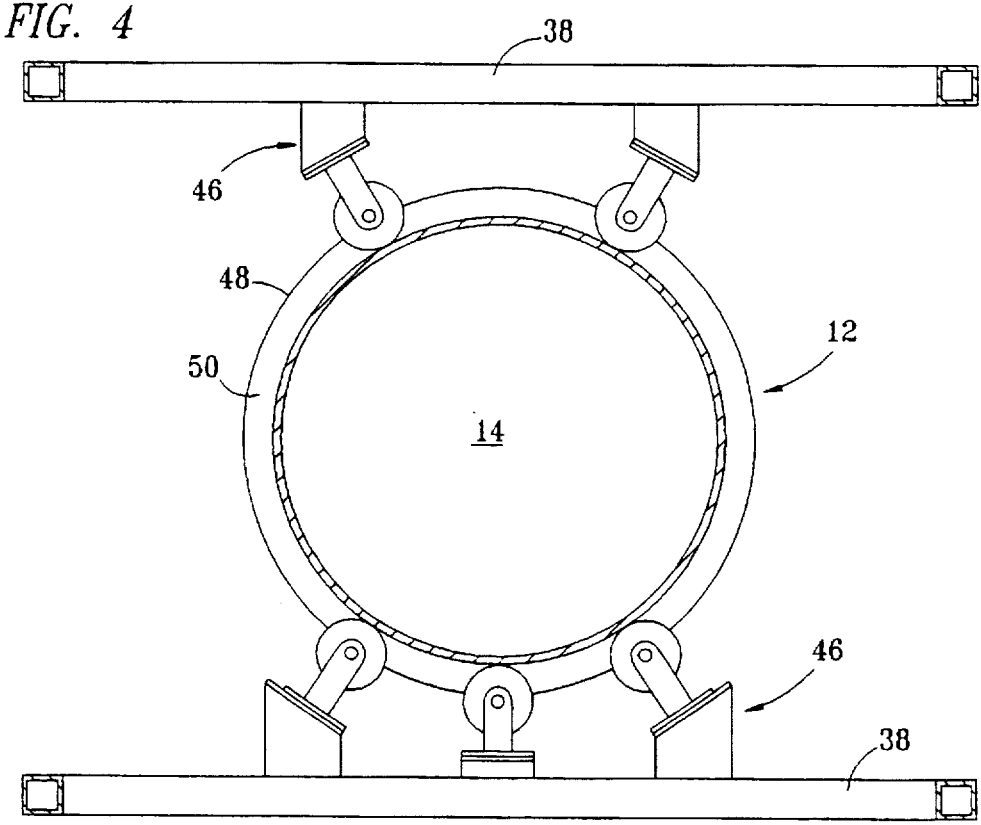
FIG. 4 is a cross section of the support frame for the housing and an input receiving opening of the singulator shown in FIG. 2.

Referring to FIG. 4, there is illustrated a partial cross section of the upper support tower 62 and the input receiving opening 14 of the singulator 10. FIG. 4 also illustrates the configuration of the lower support tower 66, therefore, the following description of the upper support tower 62 also describes the lower support tower 66. The upper support tower 62 includes a pair of support channels 38 supporting a plurality of guide rollers 46. The guide rollers 46 rotatably engage the outer surface 48 of the housing 12. There are preferably three (3) guide rollers 46 adjacent the lower portion of the housing 12, and two (2) guide rollers 46 adjacent the upper portion of the housing. The additional guide roller 46 positioned at the lower portion aids in supporting the weight of the housing 12.

The support channels 38 at both the upper support tower 62 and the lower support tower 66 are offset (refer to FIG. 2) from one another such that the guide rollers 46 correctly engage the outer surface 48 since the housing 12 is at an angle with respect to the horizontal. The outer surface 48 includes an upper V-groove 50 and a lower V-groove 52 located at opposite ends of the housing 12, where the guide rollers 46 rotatably engage the upper and lower V-grooves.

Figure 5:
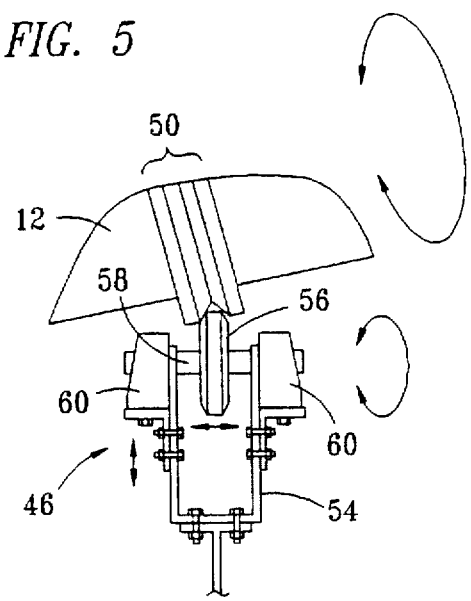
FIG. 5 is an expanded view of a guide roller secured to the support frame rotatably engaging a V-groove integral with an outer surface of the housing of the singulator shown in FIG. 2.

Referring to FIG. 5, there is illustrated a single guide roller 46 rotatably engaged near the lower portion of the housing 12. The guide roller 46 includes an adjustment bracket 54 for adjusting the position of rotating bearing 56 of the guide roller 46. The rotating bearing 56 is supported on a shaft 58 that is rotatably supported on stationary bearings 60. The stationary bearings 60 are preferably pillow block bearings. The rotating bearing 56 floats on the shaft 58 as to enable self-alignment with the V-groove 50.

Figure 6:
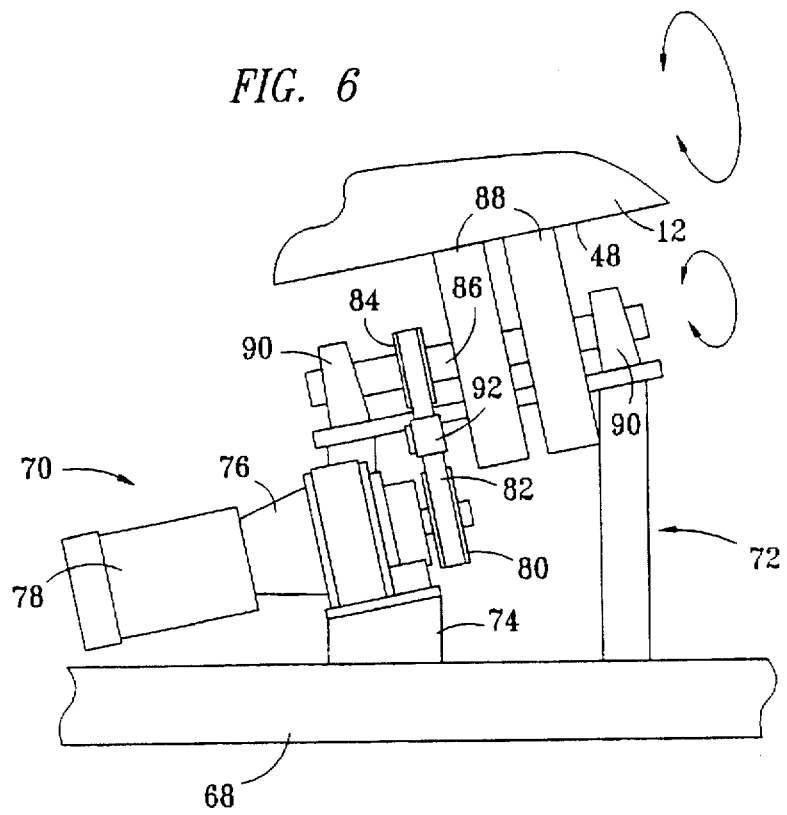
FIG. 6 is an expanded view of a drive assembly secured to the support frame and rotatably engaging the outer surface of the housing of the singulator shown in FIG. 2.

Referring now to FIG. 6, there is illustrated the drive assembly 70 including a support structure 72 attached to cross channels 68. The support structure 72 includes a motor bracket 74 having attached thereto a gear reducer 76. A drive motor 78 is coupled to the gear reducer 76 and a drive sprocket 80 is coupled to an output shaft of the gear reducer. The drive sprocket 80 engages and drives a chain belt 82 which engages a driven sprocket 84 fastened to a roller shaft 86. The roller shaft 86 is rotatably supported in a pair of pillow block bearings 90. The roller shaft 86 is fastened to a pair of drive wheels 88 engaging the outer surface 48 of the housing 12 to and impart rotational movement to the housing. Located between the drive sprocket 80 and the driven sprocket 84 is a conventional adjustor 92 that automatically adjusts the tension of the chain belt 82.

Figure 7:
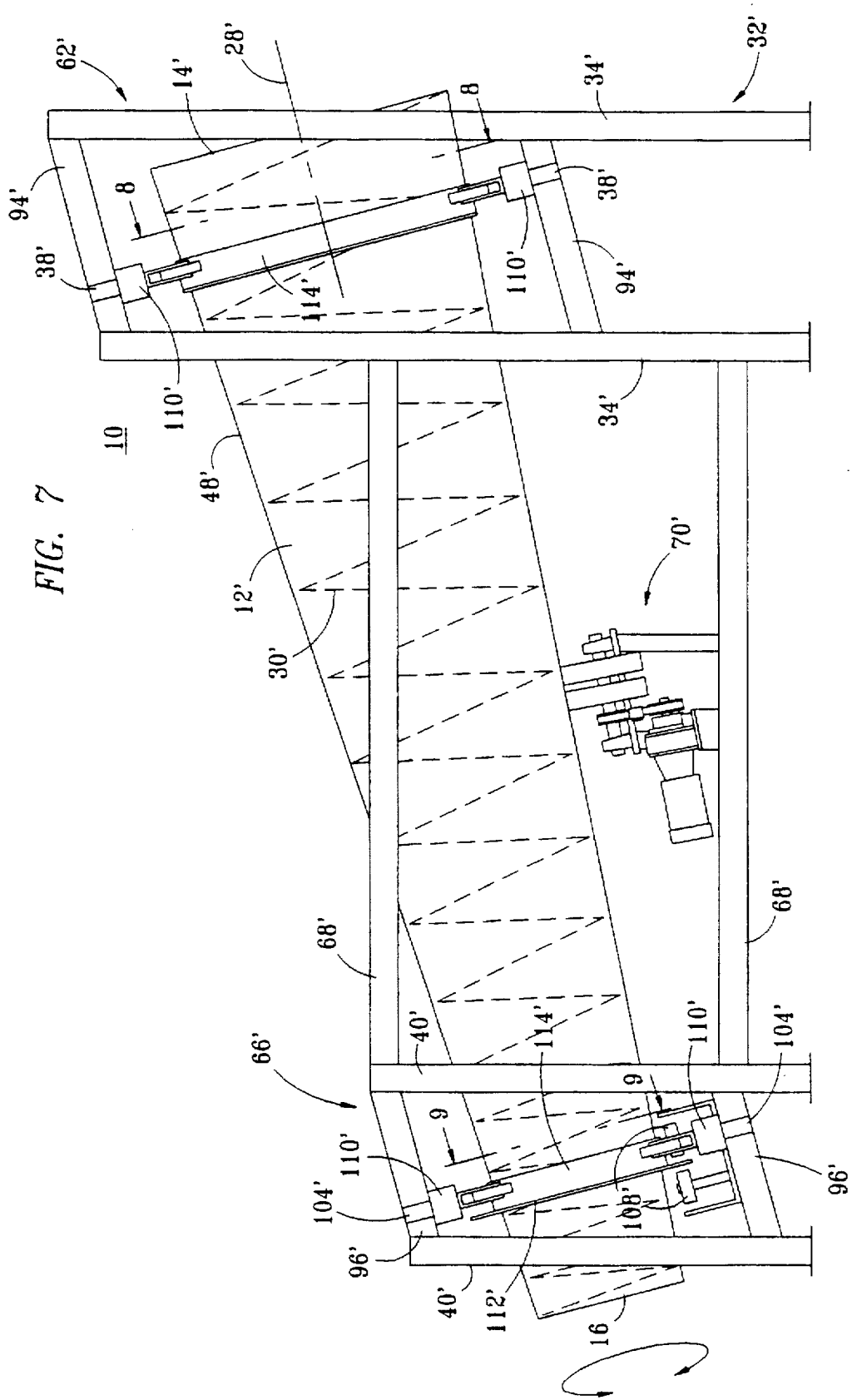
FIG. 7 is a side view of a second embodiment of the package and bundle singulator of the present invention.
Figure 8:
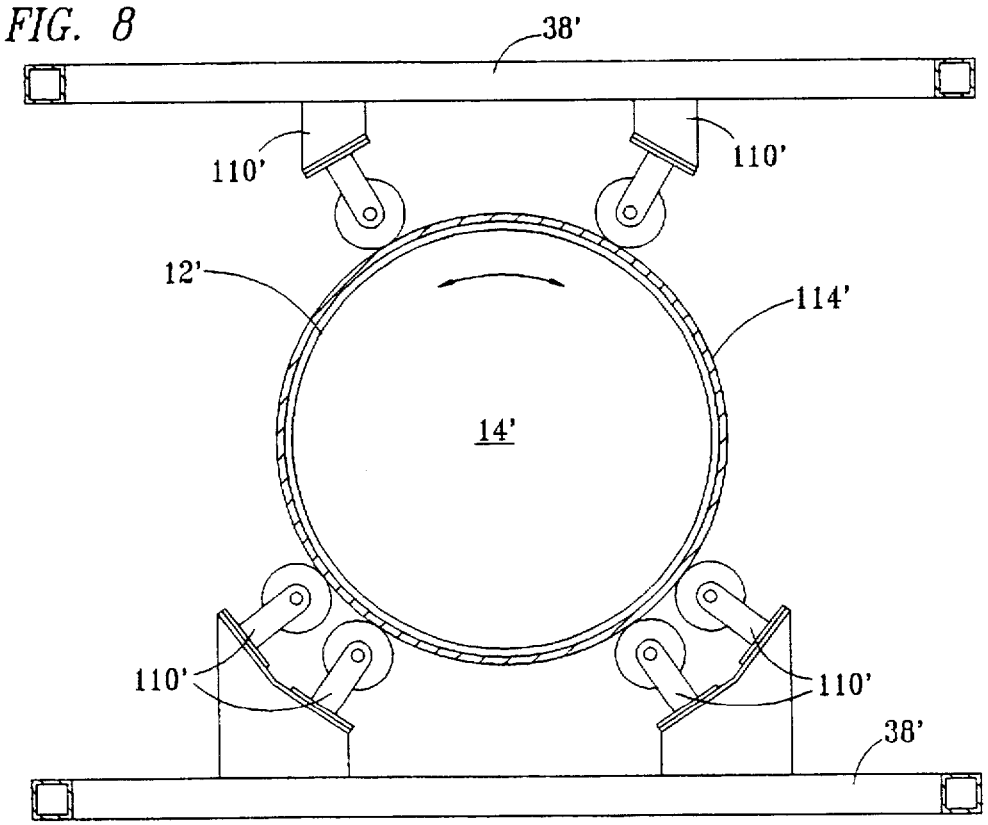
FIG. 8 is a cross section of the support frame for the housing and the input receiving opening of the singulator shown in FIG. 7.
Figure 9:
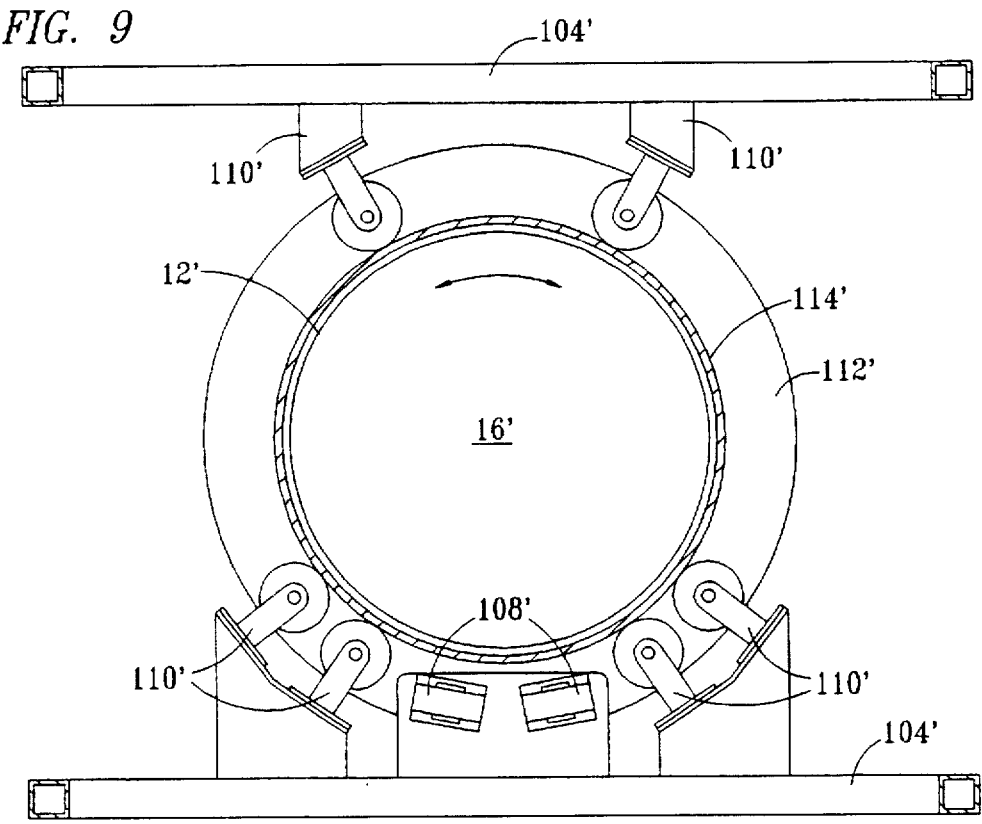
FIG. 9 is a cross section of the support frame for the housing and an outlet discharge opening of the singulator shown in FIG. 7.

Reference is now made to FIGS. 7 through 9 where a second embodiment of the singulator 10 is illustrated using prime reference numbers. The singulator 10' of the second embodiment is similar to the first embodiment except for the configuration of the upper and lower support towers 62' and 66', and the outer surface 48' of the housing 12'. Also, the second embodiment includes a plurality of parallel caster wheels 108' and a plurality of perpendicular caster wheels 110' that function much like the guide rollers 46 of the first embodiment.

Referring to FIG. 7, there is shown a side view of the second embodiment of the singulator 10'. The housing 12' is located on a support frame 32' such that the longitudinal axis 28' of the housing is angularly displaced with reference to the horizontal. Typically, the angular displacement is 150, although other angular displacements may be preferable depending on the specific configuration of the housing 12' and the helix 30'. The helix 30' is similar to the helix 30 of the first embodiment illustrated in FIG. 3, except that the pitch is less in the second embodiment.

The support frame 32' includes the upper support tower 62' and the lower support tower 66'. The upper support tower 62' comprises a plurality of vertical channels 34' and cross channels 94' for supporting an upper end of the housing 12' having the input receiving opening 14'. The lower support tower 66' comprises a plurality of vertical channels 40' and cross channels 96' for supporting the lower end of the housing 12' having the outlet discharge opening 16'.

Referring to FIGS. 8 and 9, there are illustrated partial sectional views of the upper support tower 62' and the input receiving opening 14' and the lower support tower 66' and the outlet discharge opening 16' of the singulator 10', respectively. The upper support tower 62' includes a pair of support channels 38' (refer to FIG. 8) having a plurality of primary support caster wheels 110' fastened thereto. The lower support tower 66' includes a pair of support channels 104' (refer to FIG. 9) having primary support caster wheels 110' and two one pair of thrust caster wheels 108' fastened thereto.

The primary support caster wheels 110' rotatably engage the upper portion and lower portion of the outer surface 48' of the housing 12'. A reinforcing band 114' encircling the outer surface 48' is the contacting surface of the primary support caster wheels 110' and is provided to take the forces produced by the caster wheels 110' on the housing 12' during operation of the singulator 10'. There are preferably four primary support caster wheels 101' engaging the lower portion of the outer surface 48' in each support tower 62' and 66', as opposed to two primary support caster wheels engaging the upper portion of the outer surface 48'. The additional primary support caster wheels 110' positioned near the lower portion are provided to support the weight of the housing 12'.

The two pair of thrust caster wheels 108' (FIG. 9 illustrates the two pair of thrust caster wheels) are supported to rotate substantially parallel to the outer surface 48', each parallel caster wheel rotatably engages a thrust ring 112' (Refer to FIG. 7) fastened to and encircling the outer surface 48' of the housing 12'. The thrust ring 112' is preferably an integral part of the reinforcing band 114'. The combination of the thrust caster wheels 108' and the thrust ring 112' maintains the longitudinal position of the housing 12' on the support frame 32', while permitting free rotation of the housing.

Referring again to FIG. 7, the cross channels 94' and 96' are inclined to allow the caster wheels 108' and 110' to correctly engage the reinforcing band 114' since the housing 12' is at an angle with respect to the horizontal.

To impart rotation to the housing 12', the second embodiment includes a drive assembly 70' comprising a support structure 72' attached to cross channels 68'. The support structure 72' includes a motor bracket similar to the first embodiment as shown in FIG. 6 with a gear reducer 76' attached to the motor bracket. A drive motor 78' drives the gear reducer 76' and a drive sprocket 80' is coupled to the output shaft of the gear reducer. The drive sprocket 80' drives a chain belt that engages a driven sprocket fastened to a roller shaft as described with reference to the first embodiment. The roller shaft is rotatably supported in a pair of pillow block bearings and is fastened to a pair of drive wheels 88' engaging the outer surface 48' of the housing 12' to impart rotational motion to the housing.

Figure 10:
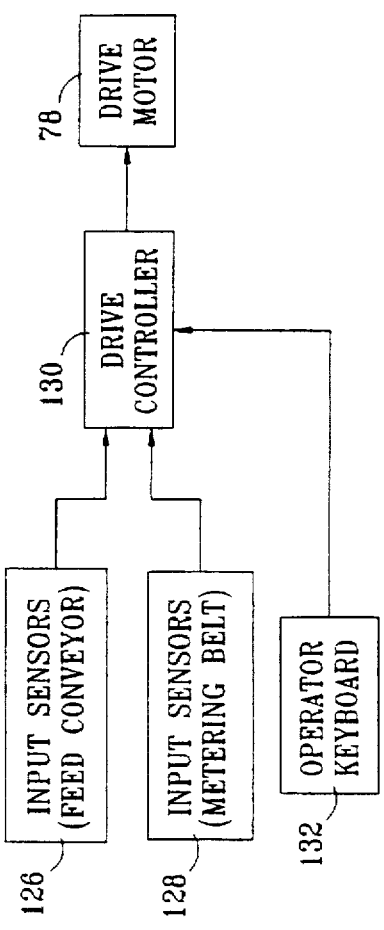
FIG. 10 is a block diagram of a control system for operation of the drive assembly for the singulator of FIGS. 2 and 7.

Referring to FIG. 10, there is shown a block diagram of a control system 150 suitable to operate the drive assembly 70 of the first embodiment and the drive assembly 70' of the second embodiment. The control system 150 includes input sensors 126 and 128 located on the feed conveyor 18 and the metering belt 22, respectively, each input sensor generates a control signal applied to a drive controller 130. The drive controller 130 energizes or deenergizes the drive motor 78 or drive motor 78' in response to the presence or absence of a package or bundle 5. An operator inputs at an operator keyboard 132 various commands which are transmitted to the drive controller 130. The commands include a rotational speed signal and start-stop signal applied to the drive controller 130 to control the drive motor 78 or the drive motor 78'.

In operation, packages and bundles 5 are placed on the feed conveyor 18 and enter the input receiving opening 14 or 14'. As the packages and bundles 5 are received in the housing 12 or 12', each engages the rotating helix 30 that provides a singulation action. Also aiding in singulating the packages and bundles 5 is the force of gravity, resulting from the angular orientation of the housing. Thus, the packages and bundles 5 randomly entering the input receiving opening 14 or 14' are singulated by passing through the housing 12 or 12' and are discharged onto the metering belt 22 in a singulated order.

While the present invention has been described with reference to the illustrated embodiments, it is not intended to limit the invention but, on the contrary, it is intended to cover such alternatives, modifications and equivalents as may be included in the spirit and scope of the invention as defined in the following claims.

I claim:

1. A package and bundle singulator, comprising:
 a hollow housing having an input receiving opening and an outlet discharge opening;
 a variable pitch, multi-turn helix mounted inside of said hollow housing extending in a direction from the input receiving opening to the outlet discharge opening, the ditch increasing from the input receiving opening to the outlet discharge opening;
 a frame for rotatably supporting said hollow housing in an orientation at an angle to the horizontal with the outlet discharge opening at a lower level than the input receiving opening; and
 a drive engaging said hollow housing to impart rotating motion thereto.

2. The package and bundle singulator in accordance with claim 1 wherein the input receiving opening of said housing has a first diameter and the outlet discharge opening has a second diameter smaller than the first diameter.

3. The package and bundle singulator in accordance with claim 1 wherein the frame includes support towers having a plurality of guide rollers mounted thereto for rotatably engaging an outer surface of the hollow housing.

4. The package and bundle singulator in accordance with claim 3 wherein the support towers include an upper support tower and a lower support tower, each having the guide rollers mounted thereto for rotatably engaging an upper portion and a lower portion, respectively, of the outer surface of the housing, said upper tower and said lower tower supporting said hollow housing at substantially the inlet receiving opening and substantially the outlet discharge opening of the housing, respectively.

5. The package and bundle singulator in accordance with claim 4 wherein said hollow housing includes an upper V-groove and a lower V-groove integral with the outer surface of the housing and further each guide roller includes an alignment bearing configured to rotatably engage either the upper V-groove or the lower V-groove.

6. The package and bundle singulator in accordance with claim 4 wherein each guide roller further includes a primary support caster wheel rotatably engaging the outer surface of the hollow housing.

7. The package and bundle singulator in accordance with claim 6 wherein said hollow housing includes a thrust ring attached thereto and said guide rollers further include at least one pair of thrust caster wheels, each thrust caster wheel rotatably engaging a surface of the thrust ring.

8. The package and bundle singulator in accordance with claim 1 wherein said drive further includes:
 at least one drive wheel engaging the outer surface of the hollow housing;
 a motor coupled to the at least one drive wheel; and
 a control system for energizing said motor to actuate the at least one drive wheel to impart rotational movement to the housing.

9. The package and bundle singulator in accordance with claim 8 wherein the control system includes sensors positioned along a feed conveyor and a metering belt for generating control signals to energize or de-energize the motor in response to the presence or absence of a package or a bundle.

10. The package and bundle singulator in accordance with claim 9 wherein the control system generates a speed signal to control the rotational speed of the hollow housing.

11. A conveyor section for singulating packages and bundles, comprising:
 a feed conveyor having a discharge end;
 a singulator having a receiving end positioned adjacent the discharge end of the feed conveyor, said singulator comprising:
 a cone shaped hollow housing having an outlet discharge opening and the input receiving opening;
 a variable pitch multi-turn helix mounted on an inner surface of said hollow housing extending in a direction from the input receiving opening to the outlet discharge opening, the pitch increasing from the input receiving opening to the outlet discharge opening;

a frame for rotatably supporting said hollow housing in an orientation at an angle to the horizontal with the outlet discharge opening at a lower level than the input receiving opening;

a drive engaging said hollow housing to impart rotating movement thereto; and a metering belt positioned adjacent the outlet discharge opening of the singulator, said metering belt receiving packages and bundles in a substantially singulated order.

12. The conveyor section in accordance with claim 11 wherein the frame of said singulator includes a support tower having a plurality of guide rollers mounted thereto rotatably engaging an outer surface of the hollow housing.

13. The conveyor section in accordance with claim 11 wherein said drive of the singulator includes:

at least one drive wheel engaging an outer surface of the hollow housing;

a motor coupled to the at least one drive wheel; and a control system for energizing said motor to actuate the at least one drive wheel to impart rotational movement to the housing.

14. A package and bundle singulator, comprising:

a circular hollow housing having an input receiving opening and an outlet discharge opening;

a variable pitch, multi-turn helix mounted inside of said hollow housing, said helix having an increasing pitch change in a direction from the input receiving opening to the outlet discharge opening;

a support frame having a plurality of guide rollers rotatably engaging said housing in an orientation at an angle to the horizontal with the outlet discharge opening at a lower level than the input receiving opening;

at least one drive wheel engaging an outer surface of the hollow housing;

a motor coupled to the at least one drive wheel; and a control system for energizing said motor to actuate the at least one drive wheel to impart rotational movement to the housing.

15. The package and bundle singulator in accordance with claim 14 wherein the input receiving opening of said housing has a first diameter and the outlet discharge opening has a second diameter smaller than the first diameter.

16. The package and bundle singulator in accordance with claim 14 wherein the support frame further includes an upper support tower and a lower support tower, each having the guide rollers engaging an upper portion and a lower portion of the outer surface of the housing, said upper support tower and the lower support tower supporting the inlet receiving opening and the outlet discharge opening of the housing, respectively.

17. The package and bundle singulator in accordance with claim 14 wherein the control system includes sensors positioned along a feed conveyor and a metering belt for generating control signals to energize or de-energize the motor in response to the presence or absence of a package or a bundle.

* * * * *